United States Patent Office 3,089,335
Patented May 14, 1963

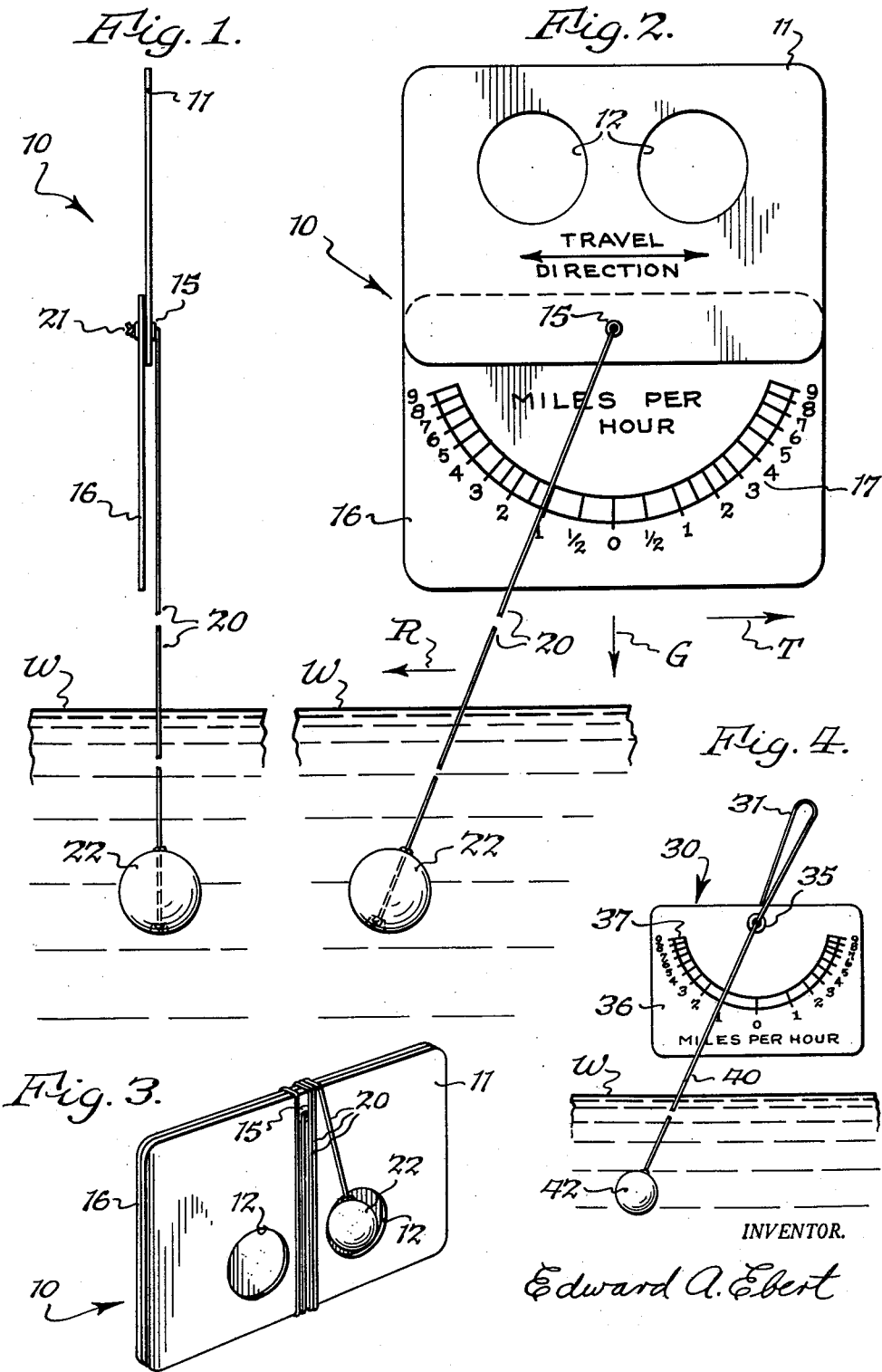

3,089,335
SPEED INDICATOR
Edward A. Ebert, 203 Huxley Drive, Snyder, N.Y.
Filed May 19, 1960, Ser. No. 30,230
6 Claims. (Cl. 73—184)

This invention relates to a speed indicator for boats and more particularly for boats moving at relatively slow speed, 0–10 miles per hour, such as while trolling. In this phase of the sport of fishing it is advantageous to know at what speed the lure is being trolled, for the particular species of fish wanted. Then, again, it is desirable to duplicate a speed that has been fruitful on a previous occasion. Gaging the speed of a boat by visual observation can be very difficult and very inaccurate since wave action and wind speed vary so much. Also the standard Pitot tube type of speedometer is inaccurate and practically useless at the slower speeds this invention is concerned with, besides being high in cost. The principle of operation of the present invention has its greatest accuracy at the slower speeds used in trolling and its useful range of speed nicely fits that of trolling.

It is therefore one of the prime objects of this invention to provide an accurate, simple and low cost article of manufacture to indicate boat speed.

Another object is to provide a compact, direct reading indicator that can be folded and reduced to a size that will easily fit in a shirt pocket.

A still further object is to have a device that can be held by the hand and put to use without any adjustment or mounting of any kind.

Also it is an object to provide an indicator which will remain accurate and never require recalibrating.

Other objects, advantages and capabilities of the invention will appear from the following description and drawings of embodiments thereof in which:

FIG. 1 is a front elevation of the indicator in the position it is used in.

FIG. 2 is an elevation of the indicator as seen from the side while in use.

FIG. 3 is a perspective of the indicator doubled upon itself with its plumb line wound about the indicator for compact storage.

FIG. 4 is a side elevation of another form of the invention.

As clearly shown in FIGS. 1 and 2, the indicator 10 comprises a holder 11, in this instance in the form of a stiff card, rectangular in shape and having two finger holes 12 to provide a secure grip on the device as it is being used. At its lower center an eyelet 15 forms a pivotal connection to a plumb part 16 which has dial markings 17 thereon. This plumb part 16 is also in this instance in the form of a rectangular card and essentially is a weighted dial which, because of its unbalance and its free pivotal mounting 15 will, by the force of gravity, as shown by arrow G, seek a vertical position in respect to a line drawn through its pivot 15 and the zero on its dial markings 17. This feature of the free levelling of plumb part 16 and its dial 17 makes possible accurate readings from the device at all times since it is automatic and requires neither effort nor knowledge on the part of the operator. Yet it consistently provides a stable base for readings to be taken from as will more clearly be understood further on.

A sensory extension, in this example, in the form of a plumb line 20 is also pivotally retained at the eyelet pivot 15, such as by a simple knot 21 tied after the line 20 is threaded through the tubular shank of the eyelet 15. This plumb line 20 is preferably of small diameter, smooth, slick material with a minimum of water resistance, and may be of any reasonable length. For convenience in handling, a six foot length would not be unwieldy to handle and store, and yet would be long enough to use on most small boats. A spherical weight or bob 22 is tied to the line 20 at its lower end and serves as the sensing part of the indicator. The vertical component is of course sensed by gravitational pull G on the weight of the spherical bob 22, which may be made of lead or other heavy material. It is specifically made spherical so that in any position it will present the same area and therefore the same resistance to its relative movement in water. This resistance, indicated by the arrow R pointing to the left in FIG. 2, causes the bob 22 to move toward the left away from a plumb or vertical position when the indicator 10 is moved to the right, as indicated by the arrow T showing the direction of travel relative to the water W. The dial markings 17 on the plumb part 16 are shown on either side of the zero or vertical indication, for the purpose of making it possible to use the device when travelling in either direction.

A modified form of the invention is illustrated in FIG. 4 in which the indicator 30 comprises a plumb part 36 with dial markings 37 identical to that shown in the first form of the invention. For a holder 31 a loop of cord is used which goes through the pivot eyelet 35 and has its ends knotted to retain it. Similarly a plumb line 40 and bob 42 is fastened in the pivot eyelet 35.

This modified form of invention has the advantage that it is non-directional. It will work in whatever direction relative movement occurs because of the flexibility and suppleness of the cord holder 31, which can easily twist so that line 40 and plumb part 36 can always be in operative positions and in planes parallel to the direction of movement of the boat.

Operation

To use the indicator 10, the user would grasp the holder through use of the finger holes 12 and then suspend the bob 22 and line 20 overboard. The plumb dial 16 will find its level position and maintain it even though the level of the boat or the user's grasp might change. Naturally, if the boat does not have relative movement with the water, the bob 22 will with its line 20, hang straight down, and using the line 20 as a pointer, the user would get a zero reading. Now any relative movement between the boat and the water in either direction will cause the line 20 and bob 22 to deviate from the zero position, assuming of course, that the indicator will be held in a vertical plane parallel to the line of movement of the boat in the water or vice versa. As soon as relative movement occurs between the boat, i.e. indicator 10 and the water, the bob 22 is then not only biased by gravity, the vertical component G, but it is also biased by resistance R, the horizontal component. If the quantity of R is great (the result of fast movement), the deflection of bob 22 away from zero will be greater than if the quantity of R is smaller. Thus, with empirical calibration, the dial markings 17 can be found and the indicator 10 becomes an accurate and reliable speedometer for low speeds. As soon as relative movement occurs between the boat and water, the line 20 will lay over that numeral of the dial markings 17 representing the speed of the boat in the water W at that moment. Conversely, if the boat is anchored, the speed of water currents can be measured. Use of the modified construction illustrated in FIG. 4 would be the same as above with the exception that the user does not have to keep the indicator parallel to the direction of relative movement since the device itself will automatically find this position.

From the foregoing it should now be apparent that the forms of the invention just described make up an accurate, easy to use, low cost speed indicator that is portable and compact.

The terms and expressions which have been employed are used as terms of description and not of limitation and there is no intention in the use of such terms and expressions of excluding any equivalents of the features shown and described, or portions thereof, it being recognized that various modifications are possible within the scope of the invention claimed.

I claim:

1. A speed indicator for measuring the relative difference in speed between said indicator and the water its sensor is immersed in, comprising a card-shaped holder, a card-shaped two-directional dial and a sensor in the form of a weighted cord, said card-shaped holder having pivot means located on its vertical center line and below its horizontal center line, said pivot means forming a free pivotal connection on a vertical center line and above the horizontal center line of said card-shaped dial, said pivot means also forming a free pivotal connection for said cord of said sensor, so that when said speed indicator is suspended by said holder, through gravitational attraction the vertical center line of said dial and said cord will coincide with a zero reading of said dial but when relative movement between said water and said speed indicator takes place in either direction parallel to the plane of the face of said dial, said cord will coincide with a speed indication on said dial equivalent to the differential speed of said indicator and said water.

2. A speed indicator for measuring the relative difference in speed between said indicator and the water its sensor is immersed in, comprising a card-shaped holder, a card-shaped two-directional dial and a sensor in the form of a weighted cord, said card-shaped holder having pivot means located on its vertical center line and below its horizontal center line, said pivot means forming a free pivotal connection on a vertical center line and above the horizontal center line of said card-shaped dial, said pivot means also forming a free pivotal connection for said cord of said sensor, so that when said speed indicator is suspended by said holder, through gravitational attraction the vertical center line of said dial and said cord will coincide with a zero reading of said dial but when relative movement between said water and said speed indicator takes place in either direction parallel to the plane of the face of said dial, said cord will coincide with a speed indication on said dial equivalent to the differential speed of said indicator and said water, said card-shaped holder and said card-shaped dial being of identical configuration for swinging about their said pivotal connection into a compact space-saving relationship, whereby the edges of their said configuration do not extend one beyond the other.

3. A speed indicator for measuring the relative difference in speed between said indicator and the water its sensor is immersed in, comprising a card-shaped holder, a card-shaped two-directional dial and a sensor in the form of a weighted cord, said card-shaped holder having pivot means located on its vertical center line and below its horizontal center line, said pivot means forming a free pivotal connection on a vertical center line and above the horizontal center line of said card-shaped dial, said pivot means also forming a free pivotal connection for said cord of said sensor, so that when said speed indicator is suspended by said holder, through gravitational atraction the vertical center line of said dial and said cord will coincide with a zero reading of said dial but when relative movement between said water and said speed indicator takes place in either direction parallel to the plane of the face of said dial, said cord will coincide with a speed indication on said dial equivalent to the differential speed of said indicator and said water, said pivotal connection of said card dial having said card holder positioned between said card dial and said sensor cord.

4. A speed indicator for measuring the relative difference in speed between said indicator and the water its sensor is immersed in, comprising a card-shaped holder, a card-shaped two-directional dial and a sensor in the form of a weighted cord, said card-shaped holder having an eyelet located on its vertical center line and below its horizontal center line, said eyelet forming a free pivotal connection on a vertical center line and above the horizontal center line of said card-shaped dial, said eyelet also forming a free pivotal connection for said cord of said sensor, so that when said speed indicator is suspended by said holder, through gravitational attraction the vertical center line of said dial and said cord will coincide with a zero reading of said dial but when relative movement between said water and said speed indicator takes place in either direction parallel to the plane of the face of said dial, said cord will coincide with a speed indication on said dial equivalent to the differential speed of said indicator and said water, said card-shaped holder and said card-shaped dial being of identical configuration for swinging about their said pivotal connection into a compact space-saving relationship, whereby the edges of their said configuration do not extend one beyond the other, and whereby said sensor cord may be adapted to hold said card-shaped holder and said card-shaped dial in said space-saving relationship by winding said cord about both of said cards.

5. A speed indicator for measuring the relative difference in speed between said indicator and the water its sensor is immersed in, comprising a card-shaped two-directional dial, a sensor in the form of a weighted cord, said card-shaped dial having an aperture located therein on its vertical center line above its horizontal center line, holding means for said dial comprising a loop of supple cord passing through said aperture, said aperture forming a free pivotal connection for said cord of said sensor and said holding means, so that when said speed indicator is suspended by said holding means through gravitational attraction the vertical center line of said dial and said cord will coincide with a zero reading of said dial but when relative movement between said water and said speed indicator takes place in either direction parallel to the plane of the face of said dial, said cord will coincide with a speed indication on said dial equivalent to the differential speed of said indicator and said water.

6. A speed indicator according to claim 5, said supple means permitting and causing said dial to twist about the axis of said sensor and holding means to lie in a vertical plane passing through said axis for automatic alignment of said dial in the direction of movement of said speed indicator.

References Cited in the file of this patent

UNITED STATES PATENTS

| | | |
|---|---|---|
| 2,152,768 | Myers | Apr. 4, 1939 |
| 2,617,297 | Moore | Nov. 11, 1952 |